(12) United States Patent  
Asai

(10) Patent No.: US 8,922,820 B2  
(45) Date of Patent: Dec. 30, 2014

(54) COMMUNICATION CONTROL TECHNOLOGY AND COMMUNICATION APPARATUS

(71) Applicant: Norihiko Asai, Tajimi (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/217,647

(22) Filed: Mar. 18, 2014

(65) Prior Publication Data

US 2014/0293331 A1 Oct. 2, 2014

(30) Foreign Application Priority Data

Mar. 28, 2013 (JP) ................................ 2013-070374

(51) Int. Cl.
*G06F 15/00* (2006.01)
*G06F 3/12* (2006.01)

(52) U.S. Cl.
CPC ............ *G06F 3/1293* (2013.01); *G06F 3/1286* (2013.01); *G06F 3/1292* (2013.01)
USPC ........................................................ 358/1.15

(58) Field of Classification Search
USPC ........................................................ 358/1.15
See application file for complete search history.

(56) References Cited

U.S. PATENT DOCUMENTS

| 2005/0207381 A1 | 9/2005 | Aljadeff et al. |
| 2006/0120313 A1 | 6/2006 | Moritomo et al. |
| 2006/0246946 A1 | 11/2006 | Moritomo et al. |
| 2009/0034731 A1 | 2/2009 | Oshima |
| 2009/0256672 A1 | 10/2009 | Yamamoto et al. |
| 2011/0063663 A1* | 3/2011 | Kim et al. .................... 358/1.15 |
| 2013/0250357 A1 | 9/2013 | Yu |

FOREIGN PATENT DOCUMENTS

JP 2007-151194 A 6/2007

OTHER PUBLICATIONS

Office Action issued in corresponding U.S. Appl. No. 13/846,964 mailed Jan. 2, 2014.
Co-Pending U.S. Appl. No. 14/217,895, filed Mar. 18, 2014.
Jul. 10, 2014—(US) Final Office Action—U.S. Appl. No. 13/846,964.
Oct. 9, 2014—(US) Non-Final Office Action—U.S. Appl. No. 14/217,895.

* cited by examiner

*Primary Examiner* — Saeid Ebrahimi Dehkordy
(74) *Attorney, Agent, or Firm* — Banner & Witcoff, Ltd.

(57) ABSTRACT

A non-transitory computer-readable medium having a communication control program stored thereon and readable by a controller of a communication apparatus, the communication control program, when executed by the controller, causes the controller to perform: determining whether a wireless setting for performing wireless communication through a second communication unit is stored; requesting a wireless setting for performing wireless communication with an external apparatus through the second communication unit from the external apparatus through a first communication unit; acquiring a wireless setting for performing wireless communication with the external apparatus through the second communication unit in response to the request; and when it is determined that the wireless setting is not stored and the wireless setting is acquired by the acquiring, setting the acquired wireless setting as the wireless setting for performing the wireless communication through the second communication unit.

18 Claims, 7 Drawing Sheets

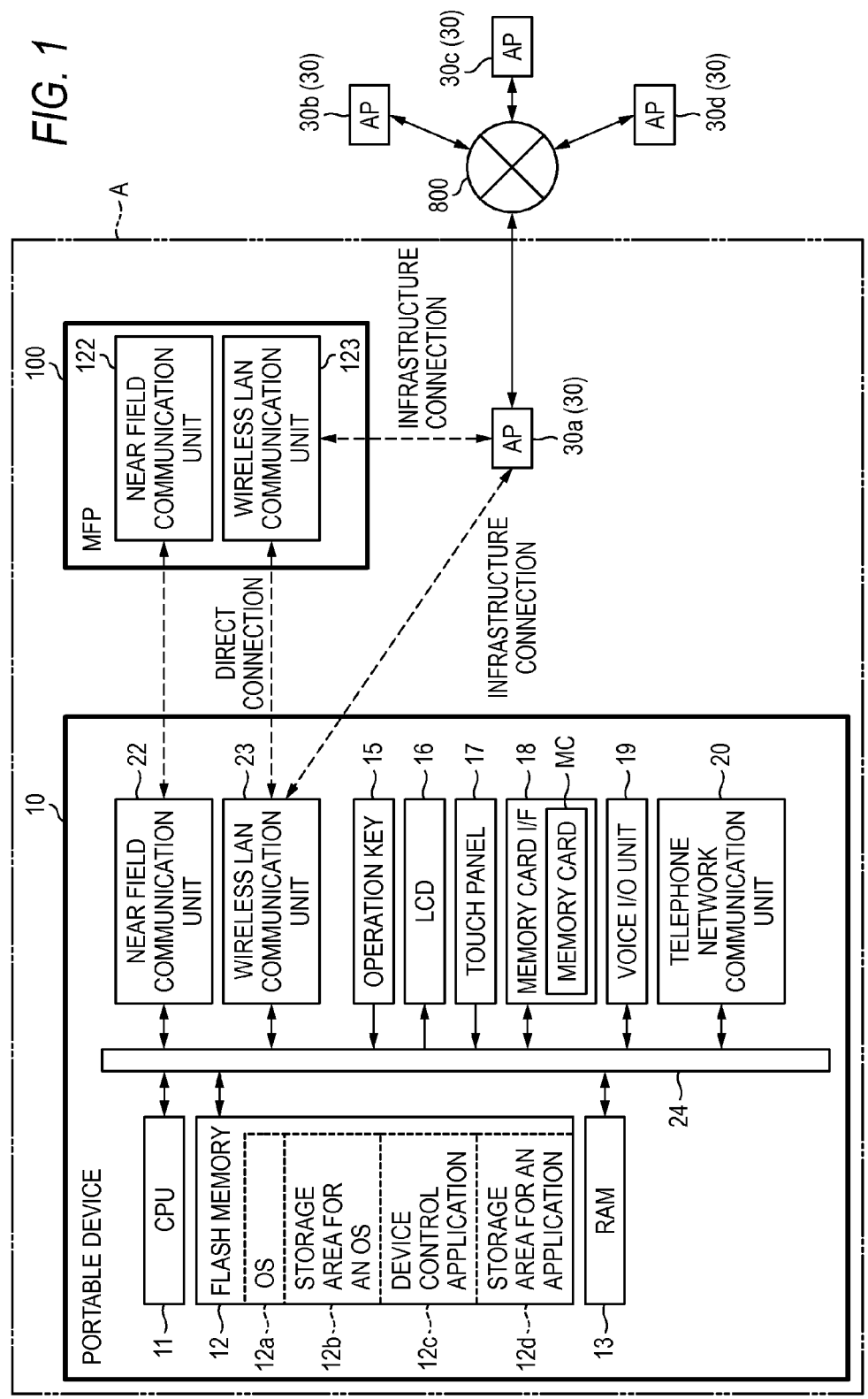

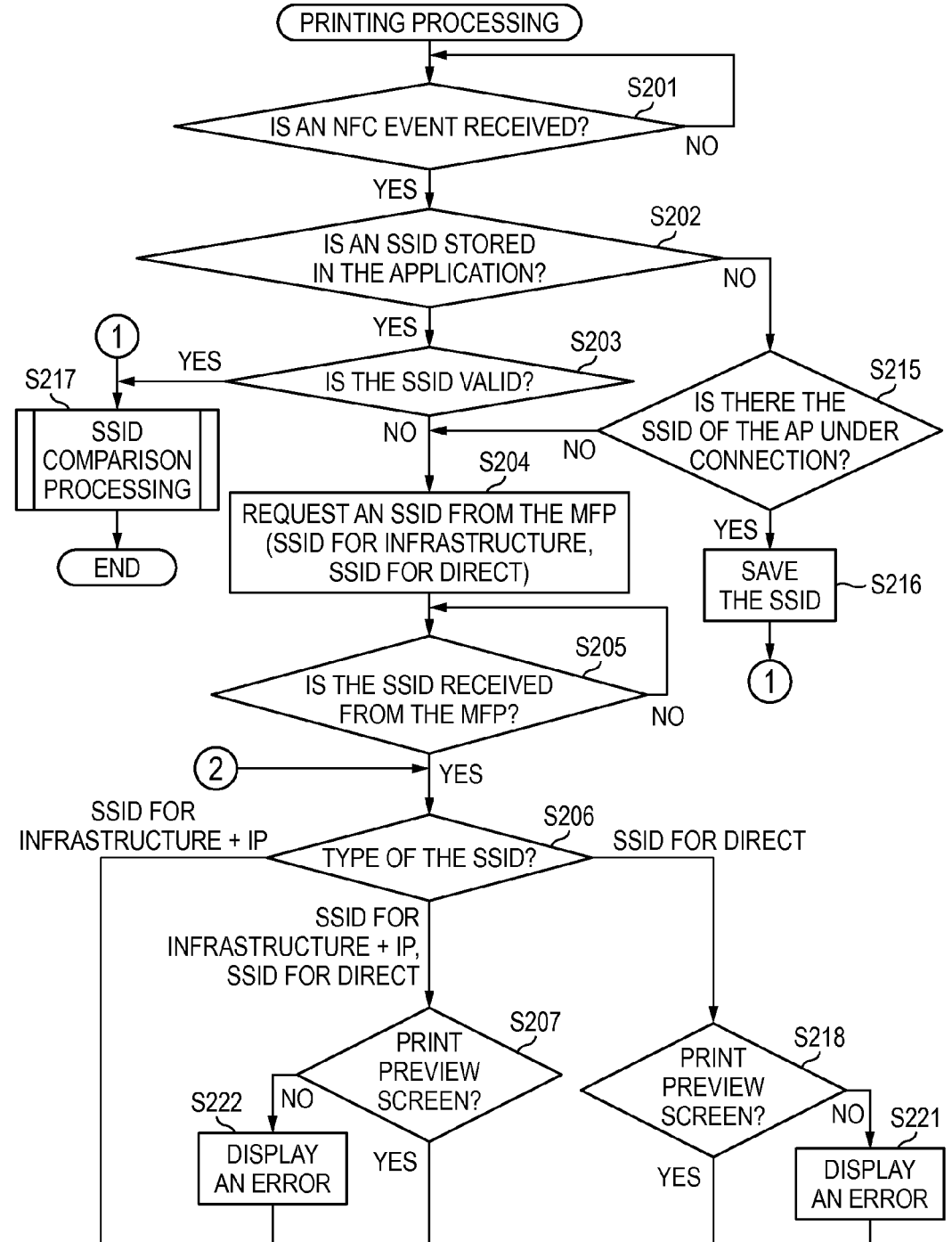

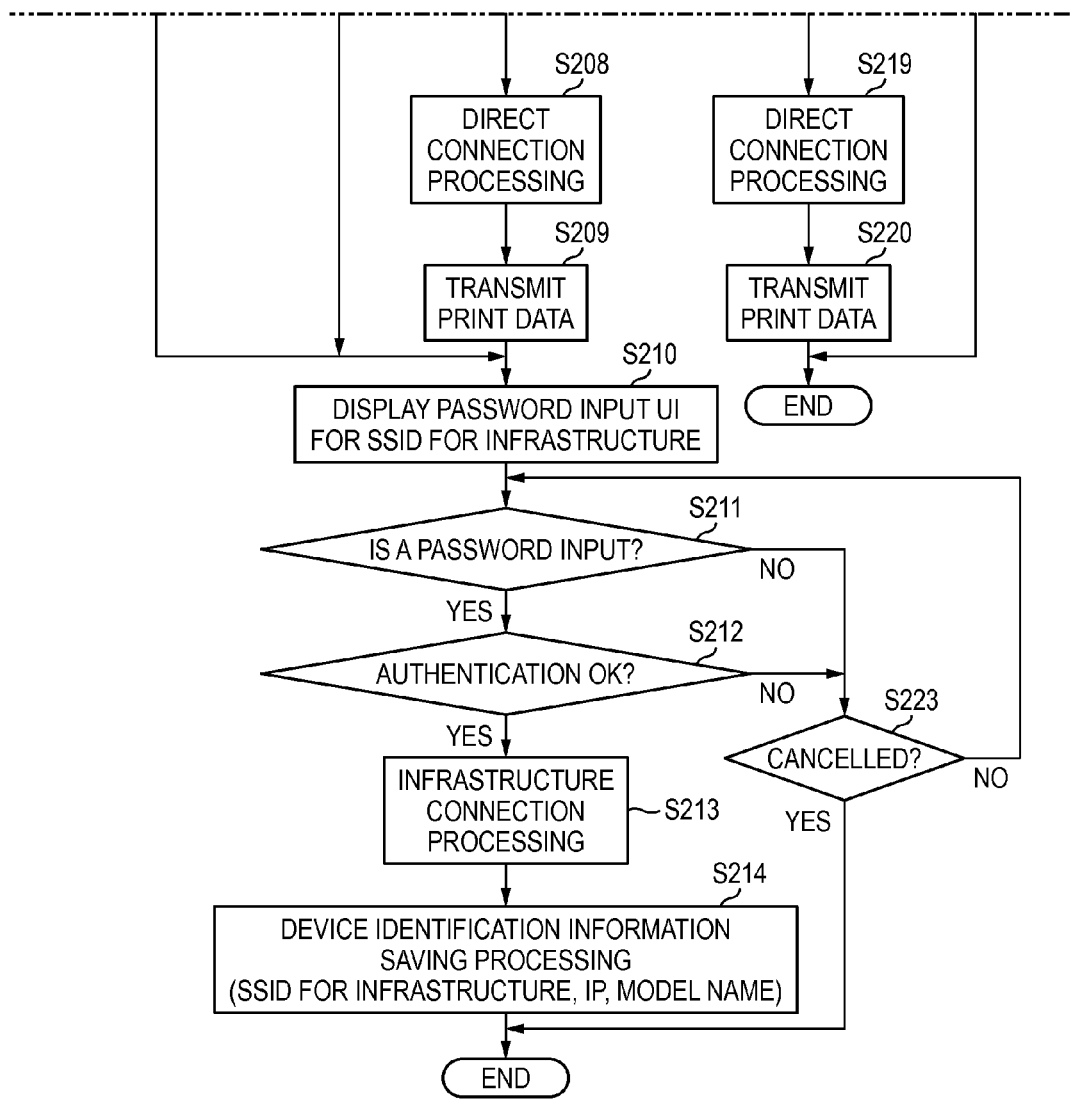

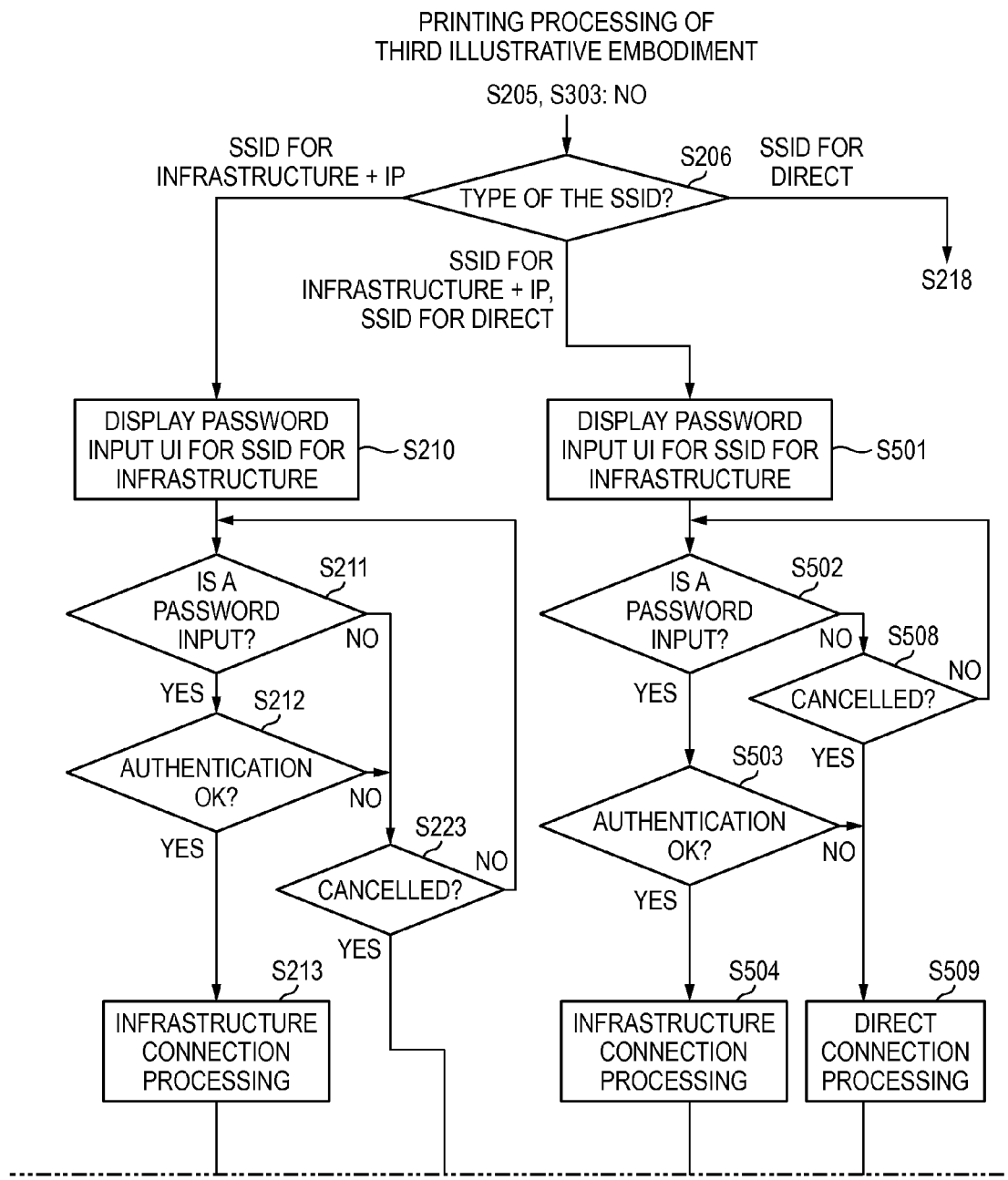

COMMUNICATION CONTROL TECHNOLOGY AND COMMUNICATION APPARATUS

CROSS-REFERENCE TO RELATED APPLICATIONS

This application claims priority from Japanese Patent Application No. 2013-070374 filed on Mar. 28, 2013, the entire subject matter of which is incorporated herein by reference.

TECHNICAL FIELD

The invention relates to a communication control program and a communication apparatus.

BACKGROUND

In a printer configured to perform a printing operation for a recording sheet, there has been proposed a technology of transmitting/receiving print data for printing by wireless communication. In this technology, the printer acquires print data from a PC, which is connected to a relay apparatus (for example, an access point) of wireless LAN, by wireless communication through the relay apparatus of the wireless LAN that covers a using place of the printer, and executes a printing operation based on the received print data.

SUMMARY

The printer that acquires the print data from the access point by the wireless communication should be wirelessly connected to the access point so as to transmit/receive data.

On the other hand, when a PC is provided with a wireless communication function, the PC should be wirelessly connected to the access point that wirelessly connected to the printer so as to transmit and receive data to and from the access point. In this case, a user should manually operate the access point, the PC and the like (e.g., input a character string) for setting the wireless connection between the PC and the access point. Such a manual operation for setting the wireless connection is a troublesome for the user.

Also, in recent years, the function of performing wireless communication through the access point is also provided to a small terminal (hereinafter, referred to as a 'portable device') which the user can carry, such as a laptop PC, a smart phone and the like. It is also necessary to perform the above troublesome process for the terminal when setting the wireless connection with the access point.

Therefore, illustrative aspects of the invention provide a communication control program and a communication apparatus capable of easily making a wireless setting for performing wireless communication for which the wireless setting is necessarily set.

According to one illustrative aspect of the invention, there is provided a non-transitory computer-readable medium having a communication control program stored thereon and readable by a controller of a communication apparatus, wherein the communication apparatus comprises: a first communication unit configured to perform communication by a near field communication method; a second communication unit configured to perform communication by a wireless communication method that is different from the near field communication method; a storage unit comprising a first storage area that is allotted to the communication control program; and the controller, the communication control program, when executed by the controller, causes the controller to perform operations comprising: a first determination process of determining whether a wireless setting for performing wireless communication through the second communication unit is stored in the first storage area; a request process of, in a case where the communication apparatus is in communication with an external apparatus through the first communication unit, requesting a wireless setting for performing wireless communication with the external apparatus through the second communication unit from the external apparatus through the first communication unit; an acquire process of, in response to the request issued by the request unit, acquiring a wireless setting for performing wireless communication with the external apparatus through the second communication unit from the external apparatus through the first communication unit; and a communication control process of, in a case where the first determination process determines that the wireless setting is not stored in the first storage area and in a case where the wireless setting is acquired from the external apparatus by the acquire process, setting the acquired wireless setting as the wireless setting for performing the wireless communication through the second communication unit.

Incidentally, the invention can be implemented by a variety of aspects such as a communication apparatus, a control device controlling the communication apparatus, a communication system, a communication method, a communication control program for controlling the communication apparatus, a computer-readable medium having the communication control program stored thereon, and the like.

BRIEF DESCRIPTION OF THE DRAWINGS

FIG. 1 is a block diagram showing an electrical configuration of a portable device having a device control application mounted therein;

FIGS. 2A and 2B are flow charts showing printing processing;

FIGS. 5A and 5B are flow charts showing printing processing of a third illustrative embodiment.

DETAILED DESCRIPTION

Figure 3:
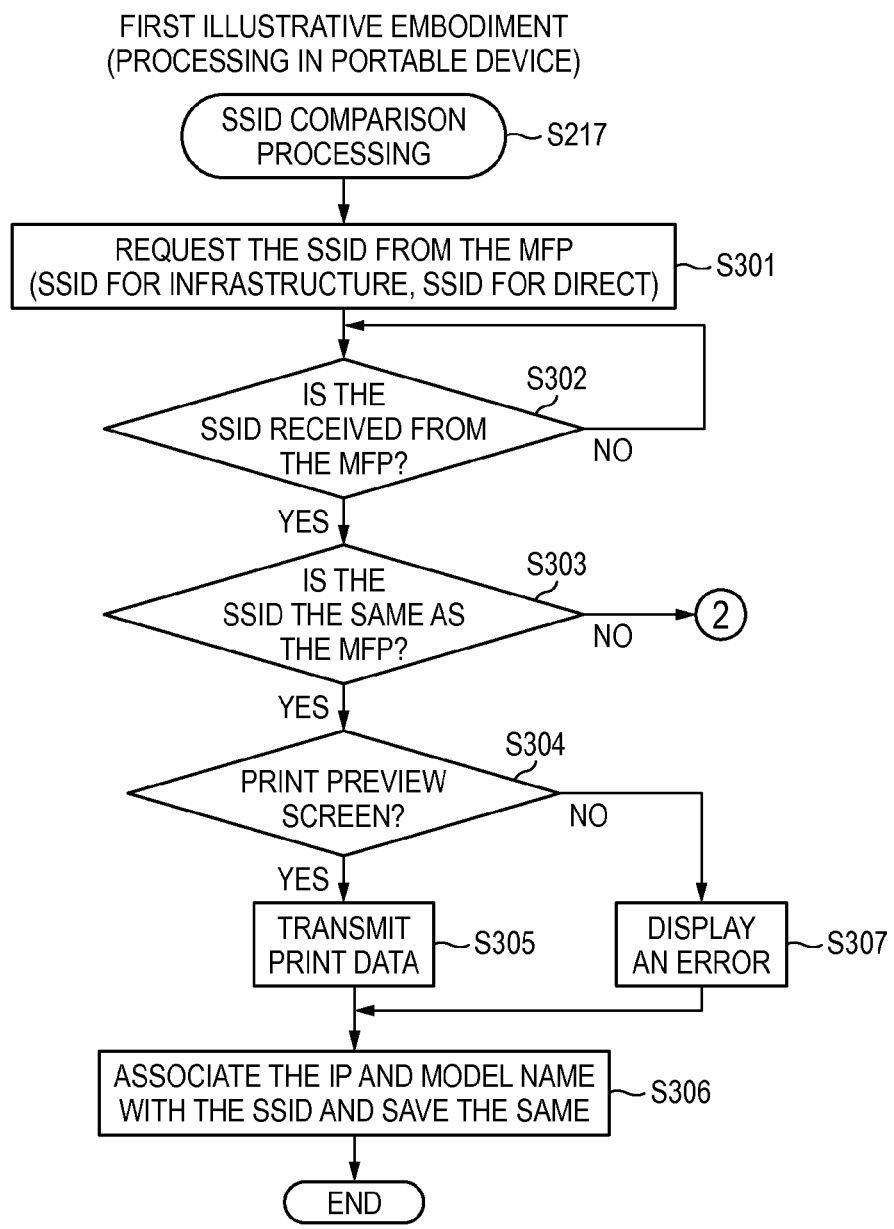
FIG. 3 is a flow chart showing SSID comparison processing.

Hereinafter, preferred illustrative embodiments of the invention will be described with reference to the accompanying drawings. First, a first illustrative embodiment is described with reference to FIGS. 1 to 3. FIG. 1 is a block diagram showing an electrical configuration of a portable device 10 having a device control application 12c mounted therein that is an illustrative embodiment of the communication control program of the invention. The portable device 10 is able to perform wireless communication (hereinafter, referred to as 'Wi-Fi communication') based on Wi-Fi (registered trademark) standards with an external apparatus such as a multi-functional peripheral apparatus (hereinafter, referred to as 'MFP'). As specifically described later, the portable device 10 having the device control application 12c mounted therein can easily make a wireless setting for performing Wi-Fi communication with the external apparatus such as the MFP 100.

The portable device 10 of this illustrative embodiment is configured by a portable device such as a smart phone. The portable device 10 is provided with a CPU (which is an abbreviation of "Central Processing Unit") 11, a flash memory 12, a RAM (which is an abbreviation of "Random Access Memory") 13, an operation key 15, an LCD (which is an abbreviation of "Liquid Crystal Display") 16, a touch panel 17, a memory card interface (memory card I/F) 18, a voice I/O (which is an abbreviation of "Input/Output") unit 19, a telephone network communication unit 20, a near field communication unit 22 and a wireless LAN (which is an abbreviation of "Local Area Network") communication unit 23. The respective units are connected to each other by a bus line 24.

The CPU 11 controls the respective units connected to the bus line 24 in response to fixed values or programs stored in the flash memory 12 and the like. The flash memory 12 is a rewritable non-volatile memory. The flash memory 12 stores therein an operating system 12a (hereinafter, referred to as the OS 12a) and the device control application 12c. In the below, the CPU 11 that executes a program such as an application and an operating system may be simply described by a program name. For example, the description of 'application' may mean the 'CPU 11 executing the application'.

The OS 12a is basic software for implementing standard functions of the portable device 10. In this illustrative embodiment, an Android (registered trademark) OS is adopted as the OS 12a. The device control application 12c is an application that is provided by a vendor of the device such as the MFP 100, is installed in the portable device 10 by a user and enables a device to be used from the portable device 10. For example, it is possible to directly use printing and scan functions of the device from the portable device 10 without through a PC and the like. The respective processing shown in flow charts of FIGS. 2 and 3 is executed by the CPU 11 in accordance with the device control application 12c.

The flash memory 12 is provided with a storage area 12b for an OS and a storage area 12d for an application. The storage area 12b for an OS is a storage area that is used by the OS 12a and is allotted to the OS 12a. A variety of setting information set by the OS 12a, for example, an SSID (which is an abbreviation of "Service Set Identifier") that is a wireless setting of the Wi-Fi communication, and the like are stored in the storage area 12b for an OS. On the other hand, the storage area 12d for an application is a storage area that is used by the device control application 12c and is allotted to the device control application 12c. The wireless setting of the Wi-Fi communication set by the device control application 12c, more specifically, an SSID of an access point (AP) 30 that is a relay apparatus is stored in the storage area 12d for an application. The RAM 13 is a rewritable volatile memory having a temporary area for temporarily storing a variety of data when the CPU 11 executes the device control application 12c and the like.

The operation key 15 is a mechanical key for inputting an instruction and the like to the portable device 10 and is provided to a housing of the portable device 10, for example. The LCD 16 is a liquid crystal display apparatus for displaying a variety of screens.

The touch panel 17 is provided with overlapping with the LCD 16 and inputs an instruction and the like to the portable device 10 when an indicator such as a finger and a rod is touched or comes close thereto. The memory card I/F 18 is an interface to which a rewritable non-volatile memory card MC is mounted, and controls writing and readout of the data to and from the memory card MC. The voice I/O unit 19 is a device for voice input and output consisting of a microphone, a speaker and the like. The telephone network communication unit 20 is a circuit for communication through a mobile telephone network (not shown).

The near field communication unit 22 is an interface for performing communication by near field communication having a communication-possible distance such as a short distance of about 10 cm. In this illustrative embodiment, the near field communication that is performed by the near field communication unit 22 is non-contact communication (hereinafter, the communication is referred to as 'NFC communication') conforming to NFC standards. In this illustrative embodiment, the portable device 10 is able to perform the NFC communication with the MFP 100 having the near field communication unit 122.

The wireless LAN communication unit 23 is an interface for performing wireless communication by the wireless LAN. In this illustrative embodiment, the communication that is performed by the wireless LAN communication unit 23 is wireless communication by the wireless LAN based on the standards of IEEE 802.11b/g. As described above, the portable device 10 is able to perform the Wi-Fi communication with the MFP 100 having the wireless LAN communication unit 23. Incidentally, a communication-possible distance by the Wi-Fi communication is about 100 m. The wireless LAN communication unit 23 is wirelessly connected to the wireless LAN communication unit 23 of the MFP 100 by any one mode of an infrastructure mode and an ad hoc mode. The infrastructure mode is a mode for wirelessly connecting the portable device 10 (the wireless LAN communication unit 23) and the MFP 100 (a wireless LAN communication unit 123) through the AP 30 that is a relay apparatus. On the other hand, the ad hoc mode is a mode for wirelessly connecting the portable device 10 and the MFP 100 each other without through the AP 30. In the below, the wireless connection by the infrastructure mode is also referred to as 'infrastructure connection' and the wireless connection by the ad hoc mode is also referred to as 'direct connection'.

The MFP 100 has a variety of functions such as printing, scan, copying, facsimile functions and the like. The MFP 100 has a printer unit, a scanner unit, a facsimile communication unit and the like (not shown) for implementing the various functions. The MFP 100 has a near field communication unit 122, like the near field communication unit 22. Also, the MFP 100 has a wireless LAN communication unit 123, like the wireless LAN communication unit 23.

The AP 30 (30a to 30d) is a relay apparatus for relaying the Wi-Fi communication between two apparatuses. The AP 30 is able to connect to a network 800. The AP 30 is able to connect to the other AP 30, a server (not shown) and the like through the network 800. As described above, the communication-possible distance of the Wi-Fi communication has a limit, such as about 100 m. Therefore, for example, as shown in FIG. 1, the portable device 10 and the MFP 100 are able to be infrastructure-connected through the AP 30 in an area A within which they are able to perform communication with the AP 30a by the Wi-Fi communication. On the other hand, the portable device 10 and the MFP 100 located in the area A are unable to be wirelessly connected to the APs 30b to 30d located beyond the area A.

FIG. 2 is a flow chart showing printing processing. The processing is processing that is executed by the CPU 11 of the portable device 10 in accordance with the device control application 12c and is to transmit print data to the MFP 100 and to enable the printing function of the MFP 100 to execute a printing operation based on the print data. This processing starts when the device control application 12c is enabled to start up and image data, which is a printing target, is selected.

When this processing starts, the CPU 11 waits for reception of an NFC event from the MFP 100 (S201: No). The NFC event is an event that is transmitted from the MFP 100 when the MFP 100 detects the portable device 10 as an antenna unit (not shown) of the near field communication unit 22 of the portable device 10 is enabled to come close to an antenna unit (not shown) of the near field communication unit 122 of the MFP 100. In S201, when the CPU 11 receives an NFC event (S201: Yes), the CPU 11 determines whether the SSIDs, which are the wireless setting of the Wi-Fi communication, are stored (saved) in the storage area 12d for an application (S202).

When the CPU 11 determines that the SSIDs are stored in the storage area 12d for an application (S202: Yes), the CPU 11 determines whether an SSID of a valid state is present in the SSIDs stored in the storage area 12d for an application (S203). Incidentally, the 'SSID of a valid state' indicates an SSID of the AP 30 that can be wirelessly connected at a current position of the portable device 10. For example, in FIG. 1, for the portable device 10 located in the area A, the SSID of the AP 30a is an SSID of a valid state. On the other hand, an SSID of the AP 30 that cannot be wirelessly connected at a current position of the portable device 10 is an 'SSID of an invalid state', not the valid state. For example, in FIG. 1, when the APs 30b to 30d are located beyond the communication-possible distance of the Wi-Fi communication as regards the portable device 10, the respective SSIDs of the APs 30b to 30d are SSIDs of an invalid state.

Specifically, in S203, the CPU 11 first acquires an available (active) SSID of the wireless setting of the Wi-Fi communication, i.e., the SSIDs stored in the storage area 12b for an OS from the OS 12a. Then, the CPU 11 compares the acquired SSID and the SSIDs stored in the storage area 12d for an application. When there is a coinciding SSID, the CPU determines that there is an SSID of a valid state. On the other hand, when there is no coinciding SSID or when an available SSID cannot be acquired, the CPU 11 determines that there is no SSID of a valid state.

In S203, when the CPU 11 determines that there is no SSID of a valid state in the SSIDs stored in the storage area 12d for an application (S203: No), the CPU 11 requests the SSID from the MFP 100 by the NFC communication (S204). More specifically, in S204, the CPU 11 requests both an SSID for infrastructure and an SSID for direct from the MFP 100. Incidentally, the 'SSID for infrastructure' is an SSID that is used when establishing the infrastructure connection with the MFP 100 through the AP 30, specifically, the SSID of the AP 30. On the other hand, the 'SSID for direct' is an SSID that is used when establishing the direct connection with the MFP 100, and is a so-called one time SSID that is issued by the MFP 100 so as to allow the connection with the wireless LAN communication unit 123 on condition that the SSID is used only one time.

On the other hand, when the CPU 11 determines in S202 that an SSID is not stored in the storage area 12d for an application (S202: No), the CPU 11 determines whether the SSID of the AP 30 under connection is stored in the storage area 12b for an OS (S215). That is, in S215, the CPU 11 determines whether the SSID of the AP 30 under connection is present in the SSIDs stored by the OS 12a. Incidentally, the description 'under connection' indicates that the infrastructure connection is established between the wireless LAN communication unit 23 and the AP 30. In S215, when the CPU 11 determines that the SSID of the AP 30 under connection is not stored in the storage area 12b for an OS (S215: No), the CPU 11 proceeds to S204. Hence, according to the device control application 12c of this illustrative embodiment, (1) when the SSIDs are stored in the storage area 12d for an application but there is no SSID of a valid state or (2) when the SSID is not stored in the storage area 12d for an application and the SSID of the AP 30 under connection is not also stored in the storage area 12b for an OS, the CPU 11 requests the SSID from the MFP 100. Therefore, when there is no SSID enabling the portable device 10 to perform the Wi-Fi communication, the CPU 11 requests the SSID from the MFP 100.

When the processing of S204 is executed, the MFP 100 sends an SSID corresponding to a situation of the MFP 100 at that time back to the portable device 10 by the NFC communication. When there is no limitation on the transmission of the SSID for infrastructure or SSID for direct to the portable device 10, the MFP 100 sends the SSID for infrastructure set in the MFP 100 and the SSID for direct issued by the MFP 100 back to the portable device 10, in response to the request from the portable device 10. On the other hand, when the MFP 100 is unable to send back the SSID for direct, for example when the SSID for direct has been issued for another terminal, the MFP 100 sends back only the SSID for infrastructure set in the MFP 100. Also, when the MFP 100 is unable to send back the SSID for infrastructure, for example when the MFP 100 is not wirelessly connected to the AP 30, the MFP 100 sends back only the SSID for direct issued by the MFP 100.

Incidentally, the MFP 100 sends the SSID having a flag attached thereto, which enables a type of the SSID to be identified as the SSID for infrastructure or SSID of direct, back to the portable device 10 so that the type of the SSID can be specified in the portable device 10. When the SSID sent back to the portable device 10 by the MFP 100 includes the SSID for infrastructure, the MFP 100 sends a password set for the SSID for infrastructure, an IP address allotted to the MFP 100 and a model name given to the MFP 100 back to the portable device 10, as data of one set, together with the SSID for infrastructure.

After the processing of S204, the CPU 11 waits for reception of the SSID from the MFP 100 by the NFC communication (S205: No). When the SSID sent back from the MFP 100 is received (S205: Yes), the CPU 11 determines the type of the received SSID (S206). In S206, the CPU 11 determines the type of the SSID, based on the flag attached to the SSID.

When the CPU 11 determines that the received SSIDs are both the SSID for infrastructure and the SSID for direct (S206: the SSID for infrastructure+the SSID for direct), the CPU 11 determines whether a screen displayed on the LCD 16 is a print preview screen (S207). When the CPU 11 determines that a print preview screen is displayed on the LCD 16 (S207: Yes), the CPU 11 executes processing for connecting the wireless LAN communication unit 23 and the wireless LAN communication unit 123 of the MFP 100 (S208) by the direct connection. Specifically, the CPU 11 sets the received SSID for direct, as the wireless setting for performing the Wi-Fi communication through the wireless LAN communication unit 23.

After the processing of S208, the CPU 11 transmits print data, which includes image data selected as a print target and a print setting set in the portable device 10, to the MFP 100 connected by the direct connection (S209) and then proceeds to S210. The MFP 100 having received the print data enables the printer unit (not shown) to execute a printing operation based on the received print data. Incidentally, after the CPU 11 transmits the print data to the MFP 100 in S209, the CPU 11 deletes the SSID for direct set so as to establish the direct connection with the MFP 100 (that is, the CPU releases the setting of the SSID for direct). Thereby, the direct connection between the portable device 10 and the MFP 100 is disconnected. Therefore, it is possible to limit the using of the SSID for direct to one time, so that it is possible to guarantee the security. On the other hand, when the CPU determines in S207 that a print preview screen is not displayed on the LCD

16 (S207: No), the CPU 11 displays a predetermined screen for displaying a message such as an error on the LCD 16 (S222), and then proceeds to S210.

In this way, the SSID for direct received from the MFP 100 is set as the wireless setting for performing the Wi-Fi communication, on condition that the preview screen is displayed on the LCD 16. However, when the preview screen is not displayed on the LCD 16, the wireless setting is not set. Hence, the user can enable the MFP 100 to execute the printing by displaying the preview screen on the LCD 16.

In S210, the CPU 11 displays a user interface (UI) for inputting a password for the received SSID for infrastructure on the LCD 16 (S210). When a password that is input to the UI displayed on the LCD 16 by the user coincides with the password received from the MFP 100, the CPU 11 determines that the password input by the user is a password validating the authentication. When a password is not input to the UI displayed on the LCD 16 (S211: No) or when a password is input but the password is an incorrect password invalidating the authentication (S211: Yes, S212: No), if the input of the password is not cancelled by a predetermined operation (S223: No), the CPU 11 returns to S211.

When a password is input to the UI displayed on the LCD 16 and the password is a correct password validating the authentication (S211: Yes, S212: Yes), the CPU 11 executes processing for infrastructure-connecting the wireless LAN communication unit 23 of the portable device 10 and the wireless LAN communication unit 123 of the MFP 100 through the AP 30 indicated by the SSID for infrastructure (S213). Specifically, the CPU 11 sets the received SSID for infrastructure, as the wireless setting for performing the Wi-Fi communication through the wireless LAN communication unit 23. Then, the CPU 11 associates and stores (saves) the received SSID for infrastructure, the received IP address, the received model name and the received password in the storage area 12*d* for an application (S214) and ends this processing.

Therefore, when the portable device 10 receives both the SSID for infrastructure and the SSID for direct from the MFP 100 in response to the request issued from the portable device 10 to the MFP 100, the CPU 11 transmits the print data to the MFP 100 by the direct connection using the SSID for direct. Since the using of the SSID for direct is limited to one time, it is possible to secure the sufficient security even though the authentication is not made using the password. Hence, while securing the sufficient security and making an operation unnecessary, which is inconvenient to a user such as the password input, it is possible to enable the MFP 100 to execute the printing based on the print data.

On the other hand, since the received SSID for infrastructure is automatically stored in the storage area 12*d* for an application on condition that the authentication by the password is valid, it is not necessary for the user to manually register the SSID for infrastructure. The SSID for infrastructure stored in the storage area 12*d* for an application can be also used as an SSID for wireless connection (infrastructure connection) with the AP 30 in a utility of transmitting the image data to a cloud server (not shown) on the network 800, not the printing utility like this illustrative embodiment.

In particular, regarding the SSID for infrastructure received from the MFP 100, the IP address and the model name of the MFP 100 having transmitted the SSID for infrastructure, i.e., the MFP 100 that is a transmission destination of the print data, are associated and stored. Hence, from next time, when the portable device 10 and the AP 30 are infrastructure-connected using one SSID for infrastructure from the SSIDs for infrastructure stored in the storage area 12*d* for an application, it is possible to set the MFP 100, which is connected through the AP 30 in S214 of this time, as the communication destination of the Wi-Fi communication through the AP 30. That is, it is possible to easily set the communication destination of the Wi-Fi communication through the AP 30 without enabling the portable device 10 to again perform the NFC communication with the MFP 100.

On the other hand, when the password input is cancelled (S223: Yes), the CPU 11 ends this processing. Hence, when the portable device 10 receives the SSID for infrastructure from the MFP 100 but the user cancels the password input to thereby abandon the authentication of the received SSID for infrastructure, the infrastructure connection using the received SSID for infrastructure is not performed and the SSID for infrastructure is not stored in the storage area 12*d* for an application.

In S206, when the CPU 11 determines that the received SSID is the SSID for direct (S206: SSID for direct), the CPU 11 determines whether the screen displayed on the LCD 16 is a print preview screen (S218). When the CPU 11 determines that a print preview screen is displayed on the LCD 16 (S218: Yes), the CPU 11 executes the direct connection processing (S219), like S208, transmits the print data (S220), like S209, and ends this processing. Meanwhile, in S219, the CPU 11 transmits the print data to the MFP 100 and then deletes the SSID for direct that has been set so as to establish the direct connection with the MFP 100. On the other hand, when the CPU 11 determines in S218 that a print preview screen is not displayed on the LCD 16 (S218: No), the CPU 11 displays a predetermined error screen on the LCD 16 (S221) and then ends this processing. Also, when the CPU 11 determines in S206 that the received SSID is the SSID for infrastructure (S206: SSID for infrastructure+IP), the CPU 11 proceeds to S211.

Therefore, when the portable device 10 receives only the SSID for infrastructure from the MFP 100 in response to the request for SSID issued from the portable device 10 to the MFP 100, the portable device 10 is wirelessly connected to the MFP 100 only when the authentication by the password is valid. Differently from the SSID for direct, the SSID for infrastructure has no limitation on the number of connection times. However, since the SSID for infrastructure has the condition of the wireless connection that the authentication by the password is valid, it is possible to secure the sufficient security. On the other hand, when the portable device 10 receives only the SSID for direct from the MFP 100, the portable device 10 is wirelessly connected to the MFP 100 without the authentication by the password. Since the SSID for direct has the limitation on the number of connection times, it is possible to secure the sufficient security even though the authentication by the password is not performed. Therefore, while the sufficient security is secured and the user does not perform a troublesome operation, it is possible to wirelessly connect the portable device 10 to the MFP 100.

When the CPU 11 determines in S203 that there is an SSID of a valid state in the SSIDs stored in the storage area 12*d* for an application (S203: Yes), the CPU 11 executes SSID comparison processing (S217) and then ends this processing. The SSID comparison processing (S217) is processing of checking whether the SSID of a valid state, which is the SSID stored in the storage area 12*d* for an application, coincides with the AP 30 wirelessly connected to the MFP 100. The detailed processing thereof will be described later with reference to FIG. 3.

Also, when the CPU 11 determines in S215 that the SSID of the AP 30 under connection is stored in the storage area 12*b* for an OS (S215: Yes), the CPU stores (saves) the corresponding SSID and the password of the SSID stored in the storage area 12b for an OS in the storage area 12d for an application (S216). Then, the CPU 11 executes the SSID comparison processing (S217) and then ends this processing. Therefore, since the SSID of the AP 30 under connection, which is the SSID for infrastructure stored in the storage area 12b for an OS, not in the storage area 12d for an application, is stored in the storage area 12d for an application, it is possible to perform the Wi-Fi communication using the SSID stored in this time from next time without the user manually registering the SSID.

FIG. 3 is a flow chart showing the SSID comparison processing (S217). Like S204, the CPU 11 requests both the SSID for infrastructure and the SSID for direct from the MFP 100 by the NFC communication (S301). Like S204, the MFP 100 having received the request sends the SSID corresponding to the situation of the MFP 100 at that time back to the portable device 10 by the NFC communication. When the SSID sent back to the portable device 10 by the MFP 100 includes the SSID for infrastructure, the MFP 100 sends the password set for the SSID for infrastructure, the IP address allotted to the MFP 100 and the model name given to the MFP 100 back to the portable device 10, as data of one set, together with the SSID for infrastructure.

After the processing of S301, the CPU 11 waits for reception of the SSID from the MFP 100 by the NFC communication (S302: No). When the SSID sent back from the MFP 100 is received (S302: Yes), the CPU 11 determines whether the SSID for infrastructure, which is a comparison target, is the SSID received from the MFP 100, i.e., the same SSID as the SSID for infrastructure set in the MFP 100, i.e., whether both SSIDs are an SSID for wireless connection with the common AP 30 (S303). Incidentally, the SSID for infrastructure, which is a comparison target in S303, is the SSID determined as the valid state in S203 or the SSID of the AP 30 under connection stored in the storage area 12d for an application in S216.

When the CPU 11 determines in S303 that the SSID for infrastructure, which is a comparison target, is the same as the SSID for infrastructure set in the MFP 100 (S303: Yes), the CPU 11 determines whether a screen displayed on the LCD 16 is a print preview screen (S304). When the CPU 11 determines that a print preview screen is displayed on the LCD 16 (S304: Yes), the CPU 11 transmits the image data selected as the print target and the print data including the print setting set in the portable device 10 to the IP address, which is received together with the SSID from the MFP 100, i.e., to the MFP 100 that is a destination through the AP 30 indicated by the SSID determined as the same in S303 (S305). On the other hand, when the CPU 11 determines in S304 that a print preview screen is not displayed on the LCD 16 (S304: No), the CPU 11 displays a predetermined error screen on the LCD 16 (S307) and proceeds to S306.

In S306, the CPU 11 associates and stores the SSID for infrastructure, which is stored in the storage area 12d for an application and is determined as the same in S303, and the IP address and model name received together with the SSID from the MFP 100 in the storage area 12d for an application (S306) and then ends this processing. Therefore, from next time, when the portable device 10 and the AP 30 are infrastructure-connected using one SSID for infrastructure from the SSIDs for infrastructure stored in the storage area 12d for an application, it is possible to set the MFP 100, which is specified by the IP address and model name stored in S306, as the communication destination of the Wi-Fi communication through the AP 30. That is, it is possible to easily set the communication destination of the Wi-Fi communication through the AP 30 without enabling the portable device 10 to again perform the NFC communication with the MFP 100.

When the CPU 11 determines in S303 that the SSID for infrastructure, which is a comparison target, is different from the SSID for infrastructure set in the MFP 100 (S303: No), the CPU 11 proceeds to S206 of FIG. 2. Thereby, when the portable device 10 receives the SSID for direct from the MFP 100, the portable device 10 and the MFP 100 are connected by the direct connection using the SSID for direct, so that the print data is transmitted. On the other hand, when the portable device 10 receives the SSID for infrastructure from the MFP 100, the portable device can store the SSID for infrastructure in the storage area 12d for an application. Incidentally, the case where the CPU 11 determines in S303 that the SSID for infrastructure, which is a comparison target, is different from the SSID for infrastructure set in the MFP 100 includes (1) a case where the SSID for infrastructure received from the MFP 100 is different from the SSID that is a comparison target or (2) a case where the SSID received from the MFP 100 is only the SSID for direct.

When the SSID received from the MFP 100 is different from the SSID, which is a comparison target, the AP 30 to which the portable device 10 is connected is different from the AP 30 to which the MFP 100 is connected. Hence, it is not possible to transmit the print data from the portable device 10 to the MFP 100 in the infrastructure connection. However, in this case, when the portable device 10 receives the SSID for direct from the MFP 100, the portable device 10 connects the portable device 10 and the MFP 100 by the direct connection by using the SSID for direct received from the MFP 100 and transmits the print data to the MFP 100. Therefore, it is possible to enable the MFP 100 to execute the printing based on the selected image data. Also, when the portable device 10 receives the SSID for infrastructure set in the MFP 100 from the MFP 100, the portable device sets the received SSID for infrastructure as the wireless setting for the Wi-Fi communication. Hence, it is possible to infrastructure-connect the portable device 10 and the MFP 100 through the common AP 30. In this way, even when the SSID received from the MFP 100 is different from the SSID, which is a comparison target, it is possible to securely perform the Wi-Fi communication between the portable device 10 and the MFP 100.

According to the first illustrative embodiment, when there is no SSID enabling the portable device 10 to perform the Wi-Fi communication, the portable device 10 requests the SSID from the MFP 100. Then, as a result of the request, the portable device 10 receives the SSID from the MFP 100 and sets the received SSID as the wireless setting for the Wi-Fi communication. Therefore, since it is possible to set the SSID in the portable device 10 even though the user does not manually set the SSID, it is possible to easily set the wireless setting for the Wi-Fi communication.

Subsequently, a second illustrative embodiment is described with reference to FIG. 4. In the first illustrative embodiment, the portable device 10 acquires at least one of the SSID for infrastructure set in the MFP 100 and the SSID for direct issued by the MFP 100 from the MFP 100 and determines whether the AP 30 indicated by the acquired SSID is an access point common to the AP 30 to which the portable device 10 is connected. In contrast, in the second illustrative embodiment, the SSID is transmitted from the portable device 10 to the MFP 100, the MFP 100 performs the determination and the portable device 10 performs control in accordance with a result of the determination. In the second illustrative embodiment, the same parts as the first illustrative embodiment are denoted with the same reference numerals and the descriptions thereof are omitted.

Figure 4:
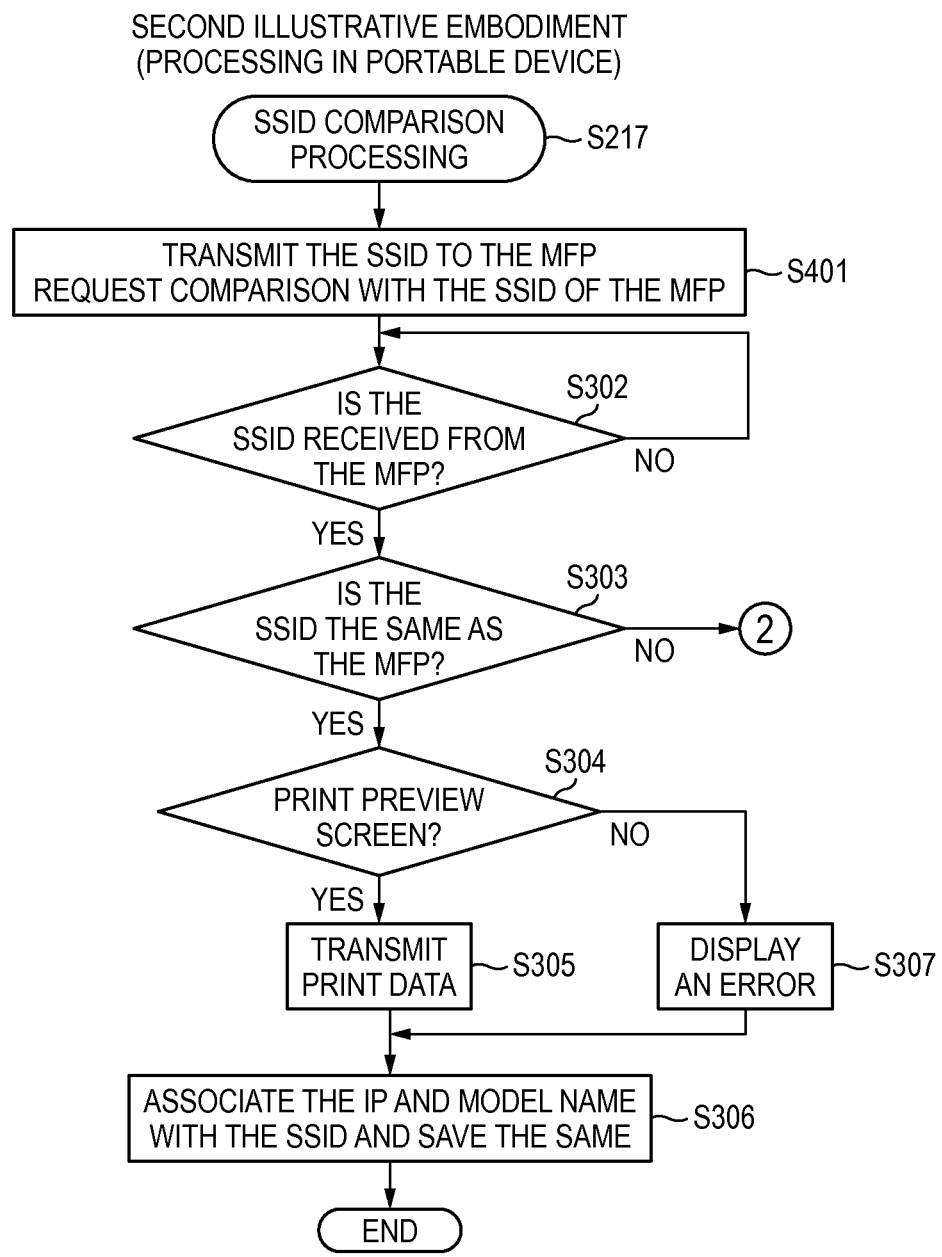
FIG. 4 is a flow chart showing SSID comparison processing of a second illustrative embodiment.

FIG. 4 is a flow chart showing the SSID comparison processing (S217) of the second illustrative embodiment. This processing is also executed by the CPU 11 of the portable device 10 in accordance with the device control application 12c. Differences to the SSID comparison processing (FIG. 3) of the first illustrative embodiment are described. In this processing, the CPU 11 transmits the SSID to the MFP 100 and requests the MFP 100 to compare the transmitted SSID and the SSID set in the MFP 100 (S401). In S401, the transmission of the SSID and the request for the comparison are performed by the NFC communication. Meanwhile, in S401, the SSID that is transmitted to the MFP 100 is the SSID determined as the valid state in S203 or the SSID of the AP 30 under connection stored in the storage area 12d for an application in S216.

The MFP 100 having received the SSID and the request for the comparison compares the SSID for infrastructure received from the portable device 10 and the SSID for infrastructure set in the MFP 100. When both the SSIDs coincide with each other, i.e., both the SSIDs are the SSID for wireless connection with the common AP 30, the MFP 100 sends 'TRUE', an IP address allotted to the MFP 100 and a model name given to the MFP 100 back to the portable device 10, as data of one set, by the NFC communication. On the other hand, when the SSID for infrastructure received from the portable device 10 is different from the SSID for infrastructure set in the MFP 100, the MFP 100 may send 'FALSE' and the SSID corresponding to the situation of the MFP 100 back to the portable device 10 by the NFC communication, like S204. Incidentally, when transmitting the SSID for infrastructure, the MFP 100 sets the SSID for infrastructure and the IP address and model name of the MFP 100 as data of one set.

After the processing of S401, the CPU 11 of the portable device 10 waits for reception of a response from the MFP 100 by the NFC communication (S302: NO). Upon receiving the response from the MFP 100 (S302: Yes), the CPU 11 proceeds to S303. When the portable device 10 receives 'TRUE' from the MFP 100, the CPU 11 determines in S303 that the SSID transmitted to the MFP 100, i.e., the SSID for infrastructure, which is a comparison target, is the same as the SSID for infrastructure set in the MFP 100. In this case (S303: Yes), the CPU 11 executes processing of S305 and ends this processing. On the other hand, when the portable device 10 receives 'FALSE' from the MFP 100, the CPU 11 determines in S303 that the SSID for infrastructure, which is a comparison target, is different from the SSID for infrastructure set in the MFP 100. In this case (S303: No), the CPU 11 proceeds to S206 of FIG. 2 and executes the processing corresponding to the type of the SSID received from the MFP 100.

According to the second illustrative embodiment, when the SSID for infrastructure enabling the portable device 10 to be infrastructure-connected, which is a comparison target, is different from the SSID for infrastructure set in the MFP 100, as the comparison result by the MFP 100, the portable device 10 can be wirelessly connected to the MFP 100 by the direct connection or the infrastructure connection through the AP 30 by using the SSID received from the MFP 100, like the first illustrative embodiment. Therefore, it is possible to securely perform the Wi-Fi communication between the portable device 10 and the MFP 100.

Subsequently, a third illustrative embodiment is described with reference to FIG. 5. In the above illustrative embodiments, when the portable device 10 receives both the SSID for infrastructure and the SSID for direct from the MFP 100, in response to the request for the SSID transmitted to the MFP 100, the portable device 10 and the MFP 100 are connected by the direct connection using the SSID for direct on condition that the print preview screen is displayed on the LCD 16. Thereby, the print data is transmitted from the portable device 10 to the MFP 100. In contrast, according to the third illustrative embodiment, when both the SSID for infrastructure and the SSID for direct are received from the MFP 100, in response to the request for the SSID transmitted to the MFP 100, the aspect of the wireless connection between the portable device 10 and the MFP 100 is controlled depending on an authentication result by a password. In the third illustrative embodiment, the same parts as the first illustrative embodiment are denoted with the same reference numerals and the descriptions thereof are omitted.

Figure 5B:
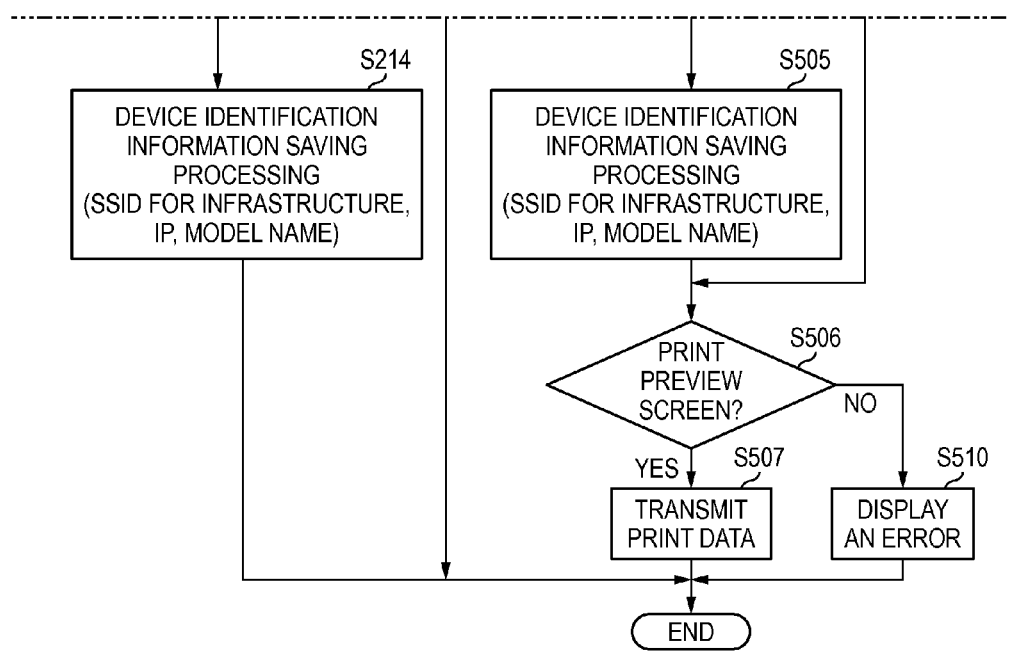

FIG. 5 is a flow chart showing printing processing of the third illustrative embodiment. This processing is also executed by the CPU 11 of the portable device 10 in accordance with the device control application 12c. FIG. 5 shows some of the respective processing configuring the printing processing of the third illustrative embodiment, which is different from the printing processing (FIG. 2) of the first illustrative embodiment. The processing that is not shown in FIG. 5 is the same as the processing corresponding to the printing processing of the first illustrative embodiment. In the below, differences to the printing processing of the first illustrative embodiment are described. In S206, when the CPU 11 determines that the SSIDs received from the MFP 100 are the SSID for infrastructure and the SSID for direct (S206: the SSID for infrastructure+IP, the SSID for direct), the CPU 11 displays a UI for inputting a password for the received SSID for infrastructure on the LCD 16 (S501). When a password is not input in the UI displayed on the LCD 16 (S502: No) and when a cancel of the password input is not instructed by a predetermined operation (S508: No), the CPU 11 returns to S502.

When a password is input in the UI displayed on the LCD 16 and the password is a correct password validating the authentication (S502: Yes, S503: Yes), the CPU 11 performs the infrastructure connection processing (S504), like the processing of S213, and associates and stores the received SSID for infrastructure, the received IP address and the received model name in the storage area 12d for an application (S504), like the processing of S214. Then, the CPU 11 proceeds to S506.

On the other hand, when the password is input to the displayed UI but the password is an incorrect password invalidating the authentication (S502: Yes, S503: No) or when the password input is cancelled (S508: Yes), the CPU 11 performs the direct connection processing, like the processing of S208, and proceeds to S506. Meanwhile, in S509, the CPU 11 transmits the print data to the MFP 100 and then deletes the SSID for direct that has been set so as to establish the direct connection with the MFP 100.

In S506, the CPU 11 determines whether the screen displayed on the LCD 16 is a print preview screen. When the CPU 11 determines that a print preview screen is displayed on the LCD 16 (S506: Yes), the CPU 11 transmits the print data, which includes the image data selected as the print target and the print setting set in the portable device 10, to the MFP 100 that is enabled to perform the Wi-Fi communication with the portable device 10 by the processing of S504 or S509 (S507) and then ends this processing. On the other hand, when the CPU 11 determined in S506 that the print preview screen is not displayed on the LCD 16 (S506: No), the CPU 11 displays a predetermined error screen on the LCD 16 (S510) and then ends this processing.

According to the third illustrative embodiment, when the portable device 10 receives both the SSID for infrastructure and the SSID for direct from the MFP 100, the portable device 10 and the MFP 100 are connected to each other by the direct connection using the received SSID for direct even though the password validating the authentication of the received SSID for infrastructure is not input. Since the SSID for direct has the limitation on the number of connection times, it is possible to secure the sufficient security even though the authentication by the password is not performed. Therefore, it is possible to transmit the print data to the MFP 100 at a state where the sufficient security is secured. Also, when the password validating the authentication of the received SSID for infrastructure is input, the portable device 10 and the MFP 100 are infrastructure-connected through the AP 30 by using the received SSID for infrastructure. Therefore, the portable device 10 is able to transmit the print data to the MFP 100 by the Wi-Fi communication through the AP 30. Also, since the SSID for infrastructure authenticated by the password is stored in the storage area 12d for an application, it is possible to perform the Wi-Fi communication by the infrastructure connection using the SSID stored in this time, from next time.

In the respective illustrative embodiments, the device control application 12c is an example of the communication control program. The portable device 10 is an example of the communication apparatus. The MFP 100 is an example of the external apparatus. The AP 30 is an example of the relay apparatus. The near field communication unit 22 is an example of the first communication unit. The wireless LAN communication unit 23 is an example of the second communication unit. The CPU 11 is an example of the controller. The flash memory 12 is an example of the storage unit. The storage area 12d for an application is an example of the first storage area. The storage area 12b for an OS is an example of the second storage area. The OS 12a is an example of the program other than the communication control program. The SSID for infrastructure and the SSID for direct are examples of the wireless setting for performing the wireless communication through the second communication unit. The SSID for direct is an example of the wireless setting having the limitation on the connection time or the number of connection times, i.e., the first wireless setting. The SSID for infrastructure is an example of the second wireless setting. The IP address and the model name are examples of the apparatus information for specifying the external apparatus as a wireless communication destination. The password input UI for the SSID for infrastructure is an example of a screen for an input relating to the authentication of the wireless setting. The print preview screen is an example of the predetermined screen relating to the predetermined function that can be executed by the external apparatus. The CPU 11 executing the processing of S202 is an example of the first determination process. The CPU 11 executing the processing of S204 is an example of the request process. The CPU 11 executing the processing of S208, S219, S213, S504 and S509 is an example of the communication control process. The CPU 11 executing the processing of S214 and S505 is an example of the first storage control process. The CPU 11 executing the processing of S215 is an example of the second determination process. The CPU 11 executing the processing of S216 is an example of the second storage control process. The CPU 11 executing the processing of S203 is an example of the third determination process. The CPU 11 executing the processing of S206 is an example of the fourth determination process. The CPU 11 executing the processing of S210 and S501 of FIG. 5 is an example of the first authentication screen display process. The CPU 11 executing the processing of S210 of FIG. 2 is an example of the second authentication screen display process. The CPU 11 executing the processing of S214 is an example of the third storage control process. The CPU 11 executing the processing of S505 is an example of the fourth storage control process. The CPU 11 executing the processing of S401 is an example of the wireless setting transmission process. The CPU 11 executing the processing of S303 is an example of the fifth determination process. The CPU 11 executing the processing of S301 is an example of the second request process. The CPU 11 executing the processing of S306 is an example of the fifth storage control process.

Although the invention has been described with reference to the illustrative embodiments, the invention is not limited to the illustrative embodiments and a variety of improvements and modifications can be easily conceived without departing from the gist of the invention.

For example, in the respective illustrative embodiments, the portable device 10 such as a smart phone has been exemplified as the communication apparatus having the device control application 12c mounted therein. However, a variety of apparatuses can be adopted as the communication apparatus insofar as it can perform wireless communication by the NFC communication and the Wi-Fi communication. For example, when an apparatus such as a tablet computer, a note-type PC, a digital camera and a music reproduction apparatus is configured to perform wireless communication by the NFC communication and the Wi-Fi communication, the corresponding apparatus can be adopted as the communication apparatus having the device control application 12c mounted therein. Also, in the respective illustrative embodiments, the OS 12a of the portable device 10 is the Android OS. However, the other OS may be also adopted.

In the respective illustrative embodiments, the SSID is set in the portable device 10 in the printing processing for enabling the MFP 100 to execute the printing function. However, the SSID may be set in the portable device 10 in the processing for enabling the MFP 100 to execute a function other than the printing function, for example the scan function. Also, the SSID may be set in the portable device 10 in processing in which data having a relatively small size such as setting data is transmitted and received through the NFC communication and data having a large size such as image data is transmitted and received through the Wi-Fi communication, without being limited to the processing for enabling the MFP 100 to execute the function. Also, in the respective illustrative embodiments, the MFP 100 having the functions such as the printing function has been exemplified as the external apparatus. However, an apparatus having a single function such as a printer and a scanner and a PC having a saving function and the like may be also adopted as the external apparatus.

In the respective illustrative embodiments, when the SSID is not stored in the storage area 12d for an application, it is determined whether the SSID of the AP 30 under connection is stored in the storage area 12b for an OS. However, a configuration may be possible in which when the SSID is not stored in the storage area 12d for an application, the request for the SSID is transmitted to the MFP 100 without determining whether the SSID is stored in the storage area 12b for an OS. Also in this case, since the SSID can be received from the MFP 100, it is possible to enable the portable device 10 to perform the Wi-Fi communication by using the received SSID, without the user manually registering the SSID.

In the respective illustrative embodiments, the CPU 11 determines in S215 whether the SSID of the AP 30 under connection is stored in the storage area 12b for an OS to thereby determine whether or not the SSID of the AP 30 under connection. Instead of this, the CPU 11 may determine whether the SSID of the AP 30 under connection is stored in the RAM 13 to thereby determine whether or not the SSID of the AP 30 under connection. That is, it may be determined whether or not the SSID of the AP 30 under connection, based on the SSID stored in the RAM 13 upon acquisition by an API (Application Programming Interface).

In the respective illustrative embodiments, the CPU 11 requests the SSID from the MFP 100 on condition that the SSID is stored in the storage area 12*d* for an application. Instead of this, the CPU 11 may request the SSID from the MFP 100, irrespective of whether the SSID is stored in the storage area 12*d* for an application, and when the SSID is received from the MFP 100 in response to the request, the CPU 11 may set the received SSID as the wireless setting for performing the Wi-Fi communication, on condition that the SSID is not stored in the storage area 12*d* for an application. This modified embodiment is implemented by executing the respective processing of S202, S203, S207 and S217 after the determination result of Yes in S205 and before the processing of S206, in the printing processing of FIG. 2.

In the third illustrative embodiment, when the SSID for infrastructure transmitted from the portable device 10 to the MFP 100 is different from the SSID for infrastructure set in the MFP 100, the portable device 10 establishes the wireless connection in accordance with the SSID received from the MFP 100. Instead of this, when the two SSIDs for infrastructure are different, the MFP 100 may establish the wireless connection by using the SSID for infrastructure that is transmitted to the MFP 100 by the portable device 10. In this case, when the two SSIDs are different, the MFP 100 sends 'FALSE', the IP address allotted to the MFP 100 and the model name given to the MFP 100 back to the portable device 10, as data of one set, by the NFC communication. When 'FALSE' is received, the portable device 10 may set the SSID transmitted to the MFP 100, as the wireless setting for performing the Wi-Fi communication with the MFP 100. Alternatively, when the two SSIDs for infrastructure are different, the MFP 100 may issue an SSID for direct and then transmit the SSID for direct to the portable device 10 together with 'FALSE'.

In the third illustrative embodiment, the portable device 10 determines in S303 whether the SSID for infrastructure, which is a comparison target, is the same as the SSID for infrastructure set in the MFP 100, based on 'TRUE' or 'FALSE' received from the MFP 100. Instead of this, when both the SSIDs are the same, the MFP 100 may send back the SSID and the IP address, and when both the SSIDs are different, the MFP 100 may not reply. In this case, the portable device 10 may determine whether both the SSIDs are the same, based on whether the SSID is received.

In the respective illustrative embodiments, the IP address and the model name have been exemplified as the apparatus information for specifying the MFP 100 of the wireless communication destination in the Wi-Fi communication by the infrastructure connection. However, only the IP address may be used. Also, instead of the IP address, a node name, a MAC address and the like may be used as the apparatus information.

In the respective illustrative embodiments, the portable device 10 determines whether the SSID received from the MFP 100 is the SSID for infrastructure or the SSID for direct, based on the flag attached to the SSID by the MFP 100. Alternatively, the type of the SSID received from the MFP 100 may be determined on the basis of whether the IP address is also sent back with the SSID by the MFP 100. In this case, the CPU 11 determines the SSID which the IP address is also sent back therewith as the SSID for infrastructure, and the CPU 11 determines the SSID which the IP address is not sent back therewith as the SSID for direct.

In the respective illustrative embodiments, when the portable device 10 receives both the SSID for infrastructure and the SSID for direct from the MFP 100, the portable device 10 transmits the print data by the direction connection, establishes the infrastructure connection by using the received SSID for infrastructure and stores the SSID for infrastructure in the storage area 12*d* for an application. Instead of this, when both the SSID for infrastructure and the SSID for direct are received from the MFP 100, the portable device may store the received SSID for infrastructure in the storage area 12*d* for an application without establishing the infrastructure connection. Also, in the respective illustrative embodiments, when the portable device 10 receives only the SSID for infrastructure from the MFP 100, the portable device 10 may establish the infrastructure connection by using the received SSID for infrastructure and then transmit the print data through the infrastructure connection.

In the respective illustrative embodiments, the SSID for direct is the SSID having the condition that it is used only one time. However, the number of using times may not be limited to one time and may be two or more times inasmuch as the security can be secured. Also, the connection limitation of the SSID for direct may be defined by a time element such as elapsed time after the SSID is issued, not by the number of using times such as one time.

In the respective illustrative embodiments, the SSID that is stored in the storage area 12*d* for an application is limited to the SSID for infrastructure. However, when the portable device 10 receives the SSID for direct from the MFP 100, in response to the request from the portable device 10, the received SSID for direct may be stored in the storage area 12*d* for an application. In this case, the SSID for direct stored in the storage area 12*d* for an application may be deleted when a predetermined condition such as the number of using times and elapsed time after the SSID is stored is satisfied.

In the respective illustrative embodiments and modified embodiments, the CPU 11 executes the respective processing of FIGS. 2 to 5. However, a plurality of CPUs may cooperatively execute the respective processing of FIGS. 2 to 5. Also, a single IC such as ASIC may independently or multiple ICs may cooperatively execute the respective processing of FIGS. 2 to 5. Also, the CPU 11 and the IC such as ASIC may cooperatively execute the respective processing of FIGS. 2 to 5.

The respective features described in the first to third illustrative embodiments and the respective modified embodiments may be appropriately combined.

Illustrative embodiments of the invention can provide at least the following advantages.

(1) According to the above-described non-transitory computer-readable medium, in the case where the wireless setting for performing wireless communication through the second communication unit is not stored in the first storage area allotted to the communication control program, the wireless setting for performing wireless communication with the external apparatus through the second communication unit, which is acquired from the external apparatus through the first communication unit performing communication with the external apparatus by the near field communication method, is set by the communication control process. Hence, it is possible to easily make a wireless setting for performing wireless communication through the second communication unit, i.e., wireless setting for which the wireless setting is necessarily set.

(2) The wireless setting (which is set by the communication control process) for performing wireless communication with the relay apparatus, which performs wireless communication with the external apparatus, through the second communication unit is stored in the first storage area. Therefore, since it is possible to use the wireless setting, which is set by a setting control process, by the communication control program, it is possible to use the wireless setting at any time by the communication control program.

(3) In the case where the wireless setting that is set by the communication control process is the wireless setting for performing wireless communication with the relay apparatus, which performs wireless communication with the external apparatus, through the second communication unit, the stored state of the wireless setting in the first storage area is kept even after the wireless communication using the wireless setting is completed. On the other hand, in the case where the wireless setting that is set by the communication control process is the wireless setting having a limitation on the connection time or the number of connection times, the wireless setting is not stored any more in the first storage area after the wireless communication using the wireless setting is completed. Hence, since the wireless setting of which the security is guaranteed by the limitation on the connection time or the number of connection times is not stored any more in the first storage area after the wireless communication using the wireless setting is completed, it is possible to suppress the wireless setting having a limitation on the connection time or the number of connection times from being set beyond the limitation on the connection time or the number of connection times.

(4) In the case where the wireless setting for performing wireless communication through the second communication unit is not stored in the first storage area and the wireless setting set as the wireless setting for performing wireless communication through the second communication unit is not stored in the second storage area allotted to the program other than the communication control program, the wireless setting for performing wireless communication with the external apparatus through the second communication unit is requested to the external apparatus through the first communication unit. As a result of the request, it is possible to set the wireless setting for performing wireless communication with the external apparatus through the second communication unit. Hence, it is possible to easily make the wireless setting for performing wireless communication for which it is necessary to set the wireless setting.

(5) In the case where the wireless setting set as the wireless setting for performing wireless communication through the second communication unit is stored in the second storage area, the wireless setting stored in the second storage area is stored in the first storage area. Therefore, since it is possible to use the wireless setting, which is used by the program other than the communication control program, by the communication control program, it is possible to use the wireless setting at any time by the communication control program.

(6) In the case where the wireless setting for performing wireless communication through the second communication unit is stored in the first storage area but the wireless setting stored in the first storage area is not the wireless setting of a valid state capable of performing wireless communication with the external apparatus through the second communication unit, the wireless setting for performing wireless communication with the external apparatus through the second communication unit is requested to the external apparatus through the first communication unit. As a result of the request, it is possible to set the wireless setting for performing wireless communication through the second communication unit. In the case where the wireless setting stored in the first storage area is not the wireless setting of a valid state, it is not possible to perform wireless communication through the second communication unit even though the corresponding wireless setting is set. In contrast, according to the non-transitory computer-readable medium of this aspect, it is possible to easily make the wireless setting for performing wireless communication through the second communication unit even at that state.

(7) The wireless setting of which the security is not guaranteed by the limitation on the connection time or the number of connection times is set on condition that an input validating the authentication of the wireless setting is made. Thus, it is possible to secure the sufficient security. On the other hand, the wireless setting having the limitation on the connection time or the number of connection times secures the sufficient security without the authentication. Therefore, in the case where the wireless setting acquired from the external apparatus is the wireless setting having the connection limitation, the acquired wireless setting is set as the wireless setting for performing wireless communication through the second communication unit without the authentication. Hence, it is possible to reduce the user's operation for setting the wireless setting without sacrificing the security.

(8) In the case where the wireless setting for performing wireless communication with the external apparatus through the second communication unit, which is acquired from the external apparatus in response to the request for the wireless setting transmitted to the external apparatus, is both the first wireless setting having the limitation on the connection time or the number of connection times and for performing wireless communication with the external apparatus without through the relay apparatus and the second wireless setting having no connection limitation and for performing wireless communication with the relay apparatus performing wireless communication with the external apparatus, the screen for an input relating to authentication of the second wireless setting is displayed on the display unit. In the case an input validating the authentication of the wireless setting, which is a target, is made on the screen, the second wireless setting is set as the wireless setting for performing wireless communication with the relay apparatus through the second communication unit. On the other hand, in the case an input validating the authentication of the wireless setting, which is a target, is not made on the screen, the first wireless setting acquired together with the second wireless setting is set as the wireless setting for performing wireless communication with the external apparatus through the second communication unit without through the relay apparatus. Hence, even when an input validating the authentication of the wireless setting, which is a target, is not made, it is possible to set the wireless setting for performing wireless communication through the second communication unit at a state where the sufficient security is secured.

(9) The wireless setting, which is set by the communication control process on the basis of the input validating the authentication of the wireless setting, which is a target, made on the screen for an input relating to the authentication, and the apparatus information for specifying the external apparatus as a wireless communication destination, which is acquired from the external apparatus through the first communication unit, are associated and stored in the first storage area. Therefore, when one wireless setting is selected and set from the first storage area, it is possible to set the external apparatus, which is associated with the wireless setting in the first storage area, as the wireless communication destination. Hence, it is possible to easily implement the wireless communication through the second communication unit without again acquiring the apparatus information from the same external apparatus through the first communication unit.

(10) In the case where the wireless setting for performing wireless communication with the external apparatus through the second communication unit, which is acquired from the external apparatus in response to the request for the wireless setting transmitted to the external apparatus, is both the first wireless setting having the limitation on the connection time or the number of connection times and for performing wireless communication with the external apparatus without through the relay apparatus and the second wireless setting having no connection limitation and for performing wireless communication with the relay apparatus performing wireless communication with the external apparatus, the first wireless setting is set as the wireless setting for performing wireless communication through the second communication unit without the authentication, and the wireless communication with the external apparatus through the second communication unit is performed by the first wireless setting. Therefore, it is possible to easily implement the wireless communication with the external apparatus through the second communication unit while reducing the user's operation for setting the wireless setting without sacrificing the security. On the other hand, the screen for an input relating to the authentication of the second wireless setting, which is acquired together with the first wireless setting, is displayed on the display unit. In the case an input validating the authentication of the wireless setting, which is a target, is made on the screen, the second wireless setting and the apparatus information for specifying the external apparatus as a wireless communication destination, which is acquired from the external apparatus through the first communication unit, are associated and stored in the first storage area. Therefore, when one wireless setting is selected and set from the first storage area, it is possible to set the external apparatus, which is associated with the wireless setting in the first storage area, as the wireless communication destination. Hence, it is possible to easily implement the wireless communication through the second communication unit without again acquiring the apparatus information from the same external apparatus through the first communication unit.

(11) In the case where the wireless setting set in the external apparatus is different from the wireless setting, which is not stored in the first storage area but stored in the second storage area, or the wireless setting of a valid state stored in the first storage area, even though the former wireless setting is set in the external apparatus and the latter wireless setting is set in the communication apparatus, it is not possible to perform wireless communication between the external apparatus and the communication apparatus because the relay apparatus with which the external apparatus performs wireless communication and the relay apparatus with which the communication apparatus performs wireless communication through the second communication unit are different each other. In contrast, in this case, since the wireless setting set in the communication apparatus is set as the wireless setting for performing wireless communication with the relay apparatus, which performs wireless communication with the external apparatus, through the second communication unit, it is possible to securely perform wireless communication with the external apparatus through the relay apparatus. Incidentally, in this aspect, the 'wireless setting for performing wireless communication with a relay apparatus, which performs wireless communication with the external apparatus, through the second communication unit' is the acquired wireless setting in the case where the communication apparatus sets the wireless setting acquired from the external apparatus through the first communication unit and is the wireless setting transmitted to the external apparatus in the case where the external apparatus sets the wireless setting transmitted from the communication apparatus.

(12) In the case where the wireless setting set in the external apparatus is different from the wireless setting, which is not stored in the first storage area but stored in the second storage area, or the wireless setting of a valid state stored in the first storage area, even though the former wireless setting is set in the external apparatus and the latter wireless setting is set in the communication apparatus, it is not possible to perform wireless communication between the external apparatus and the communication apparatus because the relay apparatus with which the external apparatus performs wireless communication and the relay apparatus with which the communication apparatus performs wireless communication through the second communication unit are different each other. In contrast, in this case, since the wireless setting acquired from the external apparatus is set as the wireless setting for performing wireless communication with the relay apparatus, which performs wireless communication with the external apparatus, through the second communication unit, it is possible to switch the relay apparatus with which the communication apparatus performs wireless communication through the second communication unit to the relay apparatus with which the external apparatus performs wireless communication. Thereby, it is possible to securely perform wireless communication with the external apparatus through the relay apparatus.

(13) In the case it is determined that both the wireless setting set in the external apparatus and the wireless setting, which is not stored in the first storage area but stored in the second storage area, or the wireless setting of a valid state stored in the first storage area are the wireless settings for performing wireless communication with the common relay apparatus, the wireless setting for performing wireless communication with the common relay apparatus and the apparatus information for specifying the external apparatus as a wireless communication destination, which is acquired from the external apparatus through the first communication unit, are associated with each other and stored in the first storage area. Hence, when one wireless setting is selected and set from the first storage area, it is possible to set the external apparatus, which is associated with the wireless setting in the first storage area, as the wireless communication destination.

(14) In the case where the wireless setting for performing wireless communication with the external apparatus through the second communication unit is acquired, in response to the request for the wireless setting transmitted to the external apparatus, the acquired wireless setting is set on condition that the predetermined screen relating to the predetermined function to be executable by the external apparatus is displayed on the display unit. By the set wireless setting, the wireless communication for enabling the external apparatus to execute the function corresponding to the predetermined screen displayed on the display unit is performed as the wireless communication with the external apparatus through the second communication unit. Therefore, the user can enable the external apparatus to execute a desired function by displaying a predetermined screen corresponding to the desired function to be executed by the external apparatus.

(15) It is possible to enable the external apparatus to execute a printing operation based on the print data transmitted from the communication apparatus having the communication control program mounted therein by the wireless communication through the second communication unit.

(16) According to the above-described communication apparatus, it is possible to obtain the same advantages as those of the above-described non-transitory computer-readable medium.

What is claimed is:

1. A non-transitory computer-readable medium having a communication control program stored thereon and readable by a controller of a communication apparatus,
wherein the communication apparatus comprises:
a first communication unit configured to perform communication by a near field communication method;
a second communication unit configured to perform communication by a wireless communication method that is different from the near field communication method;
a storage unit comprising a first storage area that is allotted to the communication control program; and
the controller,
the communication control program, when executed by the controller, causes the controller to perform operations comprising:
a first determination process of determining whether a wireless setting for performing wireless communication through the second communication unit is stored in the first storage area;
a request process of, in a case where the communication apparatus is in communication with an external apparatus through the first communication unit, requesting a wireless setting for performing wireless communication with the external apparatus through the second communication unit from the external apparatus through the first communication unit;
an acquire process of, in response to the request issued by the request unit, acquiring a wireless setting for performing wireless communication with the external apparatus through the second communication unit from the external apparatus through the first communication unit; and
a communication control process of, in a case where the first determination process determines that the wireless setting is not stored in the first storage area and in a case where the wireless setting is acquired from the external apparatus by the acquire process, setting the acquired wireless setting as the wireless setting for performing the wireless communication through the second communication unit.

2. The non-transitory computer-readable medium according to claim 1, wherein the operations further comprise:
a first storage control process of, in a case where the wireless setting set by the communication control process is a wireless setting for performing wireless communication with a relay apparatus, which is configured to perform wireless communication with the external apparatus, through the second communication unit, storing the wireless setting in the first storage area.

3. The non-transitory computer-readable medium according to claim 2,
wherein in the case where the wireless setting set by the communication control process is the wireless setting for performing wireless communication with the relay apparatus through the second communication unit, the first storage control process keeps a stored state of the wireless setting in the first storage area even after the wireless communication using the wireless setting is completed, and
wherein in a case where the wireless setting set by the communication control process is a wireless setting having a limitation on connection time or the number of connection times, the first storage control process does not keep the wireless setting in the first storage area after the wireless communication using the wireless setting is completed.

4. The non-transitory computer-readable medium according to claim 1,
wherein the storage unit comprises a second storage area that is allotted to a program other than the communication control program,
wherein the operations further comprise:
a second determination process of, in the case where the first determination process determines that the wireless setting is not stored in the first storage area, determining whether the wireless setting set as the wireless setting for performing wireless communication through the second communication unit is stored in the second storage area, and
wherein in the case where the communication apparatus is in communication with the external apparatus through the first communication unit and in a case where the second determination process determines that the wireless setting set as the wireless setting for performing wireless communication through the second communication unit is not stored in the second storage area, the request process requests the wireless setting for performing wireless communication with the external apparatus through the second communication unit from the external apparatus through the first communication unit.

5. The non-transitory computer-readable medium according to claim 4, wherein the operations further comprise:
a second storage control process of, in a case where the second determination process determines that the wireless setting set as the wireless setting for performing wireless communication through the second communication unit is stored in the second storage area, storing the wireless setting stored in the second storage area in the first storage area.

6. The non-transitory computer-readable medium according to claim 1,
wherein the operations further comprise:
a third determination process of, in a case where the first determination process determines that the wireless setting is stored in the first storage area, determining whether the wireless setting stored in the first storage area is a wireless setting of a valid state capable of performing wireless communication with a relay apparatus through the second communication unit, and
wherein in the case where the communication apparatus is in communication with the external apparatus through the first communication unit and in a case where the third determination process determines that the wireless setting stored in the first storage area is not the wireless setting of a valid state, the request process requests the wireless setting for performing wireless communication with the external apparatus through the second communication unit from the external apparatus through the first communication unit.

7. The non-transitory computer-readable medium according to claim 1,
wherein the operations further comprise:
a fourth determination process of, in the case where the wireless setting is acquired from the external apparatus by the acquire process, determining whether the acquired wireless setting is a wireless setting having a limitation on connection time or the number of connection times; and a first authentication screen display process of displaying a screen relating to authentication of the wireless setting, which is acquired from the external apparatus by the acquire process, on a display unit, wherein in a case where the fourth determination process determines that the acquired wireless setting is not a wireless setting having the connection limitation, the first authentication screen display process displays a screen for an input relating to the authentication of the acquired wireless setting on the display unit, wherein in a case where an input validating the authentication of the wireless setting, which is a target, is made on the screen displayed by the first authentication screen display process, the communication control process sets the acquired wireless setting as the wireless setting for performing wireless communication through the second communication unit, and wherein in the case where the fourth determination process determines that the acquired wireless setting is a wireless setting having the connection limitation, the communication control process sets the acquired wireless setting as the wireless setting for performing wireless communication through the second communication unit without displaying the first authentication screen by the first authentication screen display process.

8. The non-transitory computer-readable medium according to claim 7,
wherein the operations further comprise:
a third storage control process of associating and storing, the wireless setting and apparatus information in the first storage area,
wherein the wireless setting is set by the communication control process on the basis of the input validating the authentication of the wireless setting, which is a target, made on the screen displayed by the first authentication screen display process, and
wherein the apparatus information is for specifying the external apparatus as a wireless communication destination in a case where the wireless communication with the external apparatus is performed through the second communication unit by the authenticated wireless setting.

9. The non-transitory computer-readable medium according to claim 1,
wherein the operations further comprise:
a first authentication screen display process of displaying a screen relating to authentication of the wireless setting, which is acquired from the external apparatus by the acquire process, on a display unit,
wherein in the case where the wireless setting is acquired from the external apparatus by the acquire process and in a case where the acquired wireless setting is both a first wireless setting and a second wireless setting, the first authentication screen display process displays a screen for an input relating to authentication of the second wireless setting acquired from the external apparatus on the display unit,
wherein the first wireless setting has a limitation on connection time or the number of connection times and for performing wireless communication with the external apparatus without going through a relay apparatus, and
wherein the second wireless setting does not have the limitation for performing wireless communication with the relay apparatus that is configured to perform wireless communication with the external apparatus,
wherein in a case where an input validating the authentication of the wireless setting, which is a target, is made on the screen displayed by the first authentication screen display process, the communication control process sets the second wireless setting as the wireless setting for performing wireless communication with the relay apparatus through the second communication unit, and
wherein in a case where the input validating the authentication of the wireless setting, which is a target, is not made on the screen displayed by the first authentication screen display process, the communication control process sets the first wireless setting as the wireless setting for performing wireless communication with the external apparatus through the second communication unit without going through the relay apparatus.

10. The non-transitory computer-readable medium according to claim 9,
wherein the operations further comprise:
a third storage control process of associating and storing, the wireless setting and apparatus information in the first storage area,
wherein the wireless setting is set by the communication control process on the basis of the input validating the authentication of the wireless setting, which is a target, made on the screen displayed by the first authentication screen display process, and
wherein the apparatus information is for specifying the external apparatus as a wireless communication destination in a case where the wireless communication with the external apparatus is performed through the second communication unit by the authenticated wireless setting.

11. The non-transitory computer-readable medium according to claim 1,
wherein in a case where the wireless setting acquired from the external apparatus by the acquire process is both a first wireless setting and a second wireless setting, the communication control process sets the first wireless setting as the wireless setting for performing wireless communication with the external apparatus through the second communication unit and performs wireless communication with the external apparatus through the second communication unit by the first wireless setting,
wherein the first wireless setting has a limitation on connection time or the number of connection times and for performing wireless communication with the external apparatus without going through a relay apparatus configured to perform wireless communication with the external apparatus, and
wherein the second wireless setting does not have the limitation for performing wireless communication with the relay apparatus, and
wherein the operations further comprise:
a second authentication screen display process of displaying a screen for an input relating to authentication of the second wireless setting on a display unit; and
a fourth storage control process of, in a case where an input validating the authentication of the wireless setting, which is a target, is made on the screen displayed by the second authentication screen display process, associating and storing the second wireless setting and apparatus information in the first storage area, the apparatus information being acquired from the external apparatus through the first communication unit and for specifying the external apparatus as a wireless communication destination.

12. The non-transitory computer-readable medium according to claim 1,
wherein the communication apparatus comprises a second storage area that is allotted to a program other than the communication control program,
wherein the operations further comprise:
a second determination process of, in the case where the first determination process determines that the wireless setting is not stored in the first storage area, determining whether the wireless setting set as the wireless setting for performing wireless communication through the second communication unit is stored in the second storage area;
a third determination process of, in a case where the first determination process determines that the wireless setting is stored in the first storage area, determining whether the wireless setting stored in the first storage area is a wireless setting of a valid state capable of performing wireless communication with a relay apparatus through the second communication unit;
a wireless setting transmission process of, in a case where the third determination process determines that the wireless setting stored in the first storage area is the wireless setting of a valid state or the second determination process determines that the wireless setting set as the wireless setting for performing wireless communication through the second communication unit is stored in the second storage area and in the case where the communication with the external apparatus through the first communication unit is possible, transmitting the wireless setting, which is a determination target of the second determination process or the third determination process, to the external apparatus through the first communication unit; and
a fifth determination process of, in a case where information that can specify whether the wireless setting set in the external apparatus and the wireless setting transmitted by the wireless setting transmission process are wireless settings for performing wireless communication with a common relay apparatus is acquired through the first communication unit from the external apparatus, which is a transmission destination of the wireless setting, on condition that the wireless setting is transmitted by the wireless setting transmission process, determining whether the wireless setting set in the external apparatus and the transmitted wireless setting are wireless settings for performing wireless communication with the common relay apparatus, and
wherein in a case where the fifth determination process determines that the wireless setting set in the external apparatus and the transmitted wireless setting, which is a determination target of the second determination process or the third determination process, are not wireless settings for performing wireless communication with the common relay apparatus, the communication control process sets a wireless setting for performing wireless communication with a relay apparatus through the second communication unit as the wireless setting for performing wireless communication through the second communication unit.

13. The non-transitory computer-readable medium according to claim 12, wherein the operations further comprise:
a fifth storage control process of, in a case where the fifth determination process determines that the acquired wireless setting and the wireless setting, which is a determination target of the second or third determination process, are wireless settings for performing wireless communication with the common relay apparatus, associating and storing the wireless setting and apparatus information in the first storage area, wherein the apparatus information is acquired from the external apparatus through the first communication unit and is for specifying the external apparatus as a wireless communication destination.

14. The non-transitory computer-readable medium according to claim 1,
wherein the storage unit comprises a second storage area that is allotted to a program other than the communication control program,
wherein the operations further comprise:
a second determination process of, in the case where the first determination process determines that the wireless setting is not stored in the first storage area, determining whether the wireless setting set as the wireless setting for performing wireless communication through the second communication unit is stored in the second storage area;
a third determination process of, in a case where the first determination process determines that the wireless setting is stored in the first storage area, determining whether the wireless setting stored in the first storage area is a wireless setting of a valid state capable of performing wireless communication with a relay apparatus through the second communication unit;
a second request process of, in a case where the third determination process determines that the wireless setting stored in the first storage area is the wireless setting of a valid state or the second determination process determines that the wireless setting set as the wireless setting for performing wireless communication through the second communication unit is stored in the second storage area and in the case where the communication with the external apparatus through the first communication unit is possible, requesting a wireless setting set in the external apparatus from the external apparatus through the first communication unit; and
a fifth determination process of, in a case where the wireless setting set in the external apparatus is acquired from the external apparatus through the first communication unit in response to the request issued by the second request process, determining whether the acquired wireless setting and the wireless setting, which is a determination target of the second or third determination process, are wireless settings for performing wireless communication with a common relay apparatus, and
wherein in a case where the fifth determination process determines that the acquired wireless setting and the wireless setting, which is a determination target of the second or third determination process, are not wireless settings for performing wireless communication with the common relay apparatus, the communication control process sets the acquired wireless setting as the wireless setting for performing wireless communication with a relay apparatus, which performs wireless communication with the external apparatus, through the second communication unit.

15. The non-transitory computer-readable medium according to claim 14, wherein the operations further comprise:

a fifth storage control process of, in a case where the fifth determination process determines that the acquired wireless setting and the wireless setting, which is a determination target of the second or third determination process, are wireless settings for performing wireless communication with the common relay apparatus, associating and storing the wireless setting and apparatus information in the first storage area, wherein the apparatus information is acquired from the external apparatus through the first communication unit and is for specifying the external apparatus as a wireless communication destination.

16. The non-transitory computer-readable medium according to claim 1, wherein in the case where the wireless setting is acquired from the external apparatus by the acquire process, the communication control process comprises:
    setting the acquired wireless setting as the wireless setting for performing wireless communication through the second communication unit, on condition that a predetermined screen relating to a predetermined function to be executable by the external apparatus is displayed on a display unit; and
    performing wireless communication, which is the wireless communication with the external apparatus through the second communication unit and for enabling the external apparatus to execute a function corresponding to the predetermined screen, by the set wireless setting.

17. The non-transitory computer-readable medium according to claim 16, wherein the predetermined function that is executable by the external apparatus is a function of executing a printing operation based on print data transmitted from the communication apparatus.

18. A communication apparatus comprising:
a first communication unit configured to perform communication with by a near field communication method;
a second communication unit configured to perform communication by a wireless communication method different from the near field communication method;
a storage unit comprising a first storage area that is allotted to a communication control program; and
a controller configured to:
    determine whether a wireless setting for performing wireless communication through the second communication unit is stored in the first storage area;
    in a case where the communication apparatus is in communication with an external apparatus through the first communication unit, request the wireless setting for performing wireless communication with the external apparatus through the second communication unit from the external apparatus through the first communication unit;
    in response to the request, acquire a wireless setting for performing wireless communication with the external apparatus through the second communication unit from the external apparatus through the first communication unit; and
    in a case where it is determined that the wireless setting is not stored in the first storage area and in a case where the wireless setting is acquired from the external apparatus by the acquiring, set the acquired wireless setting as the wireless setting for performing wireless communication through the second communication unit.

* * * * *